United States Patent
Low et al.

(10) Patent No.: US 12,365,411 B2
(45) Date of Patent: Jul. 22, 2025

(54) BIKE BAG

(71) Applicant: Dick's Sporting Goods, Inc., Coraopolis, PA (US)

(72) Inventors: Dustin Low, Pittsburgh, PA (US); Casper Adam Crouse, IV, Coraopolis, PA (US); Craig Francis Hofmann, Pittsburgh, PA (US)

(73) Assignee: Dick's Sporting Goods, Inc., Coraopolis, PA (US)

( * ) Notice: Subject to any disclaimer, the term of this patent is extended or adjusted under 35 U.S.C. 154(b) by 8 days.

(21) Appl. No.: 17/823,009

(22) Filed: Aug. 29, 2022

(65) Prior Publication Data

US 2024/0067291 A1 Feb. 29, 2024

(51) Int. Cl.
*B62J 9/26* (2020.01)
*B62J 9/22* (2020.01)
*B62J 9/27* (2020.01)
*B62J 27/00* (2020.01)

(52) U.S. Cl.
CPC .................. *B62J 9/27* (2020.02); *B62J 9/22* (2020.02); *B62J 9/26* (2020.02); *B62J 27/00* (2013.01)

(58) Field of Classification Search
CPC ......... B62J 9/26; B62J 9/27; B62J 9/22; B62J 9/23; B62J 7/00; B62J 7/04
USPC ................................ 224/421, 425–427, 433
See application file for complete search history.

(56) References Cited

U.S. PATENT DOCUMENTS

| | | | |
|---|---|---|---|
| 575,536 A | 1/1897 | Swanson | |
| 3,888,397 A | 6/1975 | Koizumi | |
| 4,261,491 A | 4/1981 | Schroeder | |
| 4,450,988 A | 5/1984 | Meisel | |
| 4,515,300 A | 5/1985 | Cohen | |
| 4,566,617 A * | 1/1986 | Jackson | B62J 9/26 224/427 |
| 4,598,846 A | 7/1986 | Schroeder | |
| 4,643,343 A * | 2/1987 | Goldman | B62J 9/26 224/427 |
| 4,852,778 A | 8/1989 | Beiser et al. | |

(Continued)

FOREIGN PATENT DOCUMENTS

DE 202004015476 U1 * 2/2005 ............. A45C 13/02

OTHER PUBLICATIONS

Machine translation for DE-202004015476-U1. (Year: 2005).*
DE-202004015476-U1 machine translation (Year: 2005).*

*Primary Examiner* — Adam J Waggenspack
(74) *Attorney, Agent, or Firm* — Foley & Lardner LLP

(57) ABSTRACT

A bike bag includes a first storage compartment including a first rigid outer surface, the first storage compartment configured to be selectively closable. The bike bag further includes a second storage compartment including a second rigid outer surface, the second storage compartment separated from the first storage compartment by a divider. The second storage compartment is also configured to be selectively closable independently of the first storage compartment. The bike bag further includes an attachment system. The attachment system includes a first attachment member disposed at a first side of the bike bag and a second attachment member disposed at a second side of the bike bag (adjacent to the first side of the bike bag). The bike bag is selectively couplable, using the first attachment member and the second attachment member, to at least a top tube or a saddle of a bike.

20 Claims, 8 Drawing Sheets

(56) References Cited

U.S. PATENT DOCUMENTS

| | | | |
|---|---|---|---|
| D336,740 S | 6/1993 | Graf | |
| D336,878 S | 6/1993 | Graf | |
| D339,095 S | 9/1993 | Anderson | |
| 5,245,517 A * | 9/1993 | Fenton | B62J 6/01 |
| | | | 362/802 |
| D346,489 S | 5/1994 | Bean et al. | |
| 5,409,153 A * | 4/1995 | Ristich | A45C 1/04 |
| | | | D3/238 |
| 5,460,303 A | 10/1995 | Downs | |
| D366,446 S | 1/1996 | Berman | |
| D366,447 S | 1/1996 | Berman | |
| 5,762,170 A * | 6/1998 | Shyr | A45C 5/14 |
| | | | 190/114 |
| 5,862,965 A * | 1/1999 | Nakahara | B62J 9/22 |
| | | | 224/419 |
| 5,878,930 A * | 3/1999 | Schwimmer | B62J 9/26 |
| | | | 248/221.11 |
| 6,237,766 B1 * | 5/2001 | Hollingsworth | A45C 13/26 |
| | | | 190/110 |
| 6,253,979 B1 | 7/2001 | Samson | |
| 6,328,190 B1 | 12/2001 | Lohr | |
| 6,915,934 B2 * | 7/2005 | Hassett | A45F 5/00 |
| | | | 224/617 |
| 8,056,784 B2 * | 11/2011 | Dacko | B62J 9/26 |
| | | | 224/427 |
| 8,752,740 B2 * | 6/2014 | Morgan | A45F 5/00 |
| | | | 224/222 |
| 9,840,295 B1 | 12/2017 | Chuang | |
| 10,211,875 B1 * | 2/2019 | Glass, Jr. | A45F 5/00 |
| 10,427,742 B2 | 10/2019 | Osada et al. | |
| 11,001,325 B2 * | 5/2021 | Wilkey | B62J 9/40 |
| D927,401 S | 8/2021 | Fang | |
| D938,891 S | 12/2021 | Fang | |
| D939,424 S | 12/2021 | Fang | |
| 2004/0031834 A1 | 2/2004 | Barr | |
| 2012/0187170 A1 * | 7/2012 | Ho | B62J 9/27 |
| | | | 224/441 |
| 2013/0048689 A1 * | 2/2013 | Ling | B62B 3/146 |
| | | | 224/411 |
| 2013/0207423 A1 | 8/2013 | Russell et al. | |
| 2017/0245626 A1 | 8/2017 | Nehmad | |
| 2023/0365288 A1 * | 11/2023 | Block | B62J 9/26 |

* cited by examiner

BIKE BAG

BACKGROUND

The disclosure relates generally to bicycle accessories, and in particular to bags for containing items while traveling on a bike.

Cycling is widely regarded as an effective and efficient mode of transportation, particularly for short to moderate distances. Furthermore, cycling provides a variety of health benefits. For longer durations or distances rides, cyclists may wish to carry accessories with them, such as tools and/or repair kits, or cyclists may want to safely secure their car/house keys, mobile phone, and the like, while riding. These items may be cumbersome to carry in pockets, or may impede pedaling or other aspects of bike operation if carried in pockets. Furthermore, pockets may not provide adequate protection for items such as mobile phones against inclement weather or other damage. In some cases, cyclists may want to carry such delicate items in a highly protected area of the bike. However, this may preclude convenient access to the items when seated on the bike.

This document describes systems that are directed to addressing the problems described above, and/or other issues.

SUMMARY

The present disclosure describes embodiments related to bicycle accessories, and in particular to bags for containing items while traveling on a bike. A bike bag includes a first storage compartment including a first rigid outer surface, the first storage compartment configured to be selectively closable. The bike bag further includes a second storage compartment including a second rigid outer surface, the second storage compartment separated from the first storage compartment by a divider. The second storage compartment is also configured to be selectively closable independently of the first storage compartment. The bike bag further includes an attachment system. The attachment system includes a first attachment member disposed at a first side of the bike bag and a second attachment member disposed at a second side of the bike bag (adjacent to the first side of the bike bag). The bike bag is selectively couplable, using the first attachment member and the second attachment member, to at least a top tube or a saddle of a bike.

Implementations of the disclosure may include one or more of the following optional features. In some implementations, the bike bag further includes a first water-resistant zipper, wherein the first storage compartment is configured to be selectively closable by the first water-resistant zipper. In some implementations, the first attachment member includes an adjustable-length hook-and-loop closure system. The first storage compartment may further include flexible walls that are exposed when the first storage compartment is opened. The bike bag may further include one or more reflective elements. At least one of the first or second rigid outer surfaces may be shaped to conform to a part of the bike. The first and second rigid outer surfaces may be configured to pivot with respect to each other in a clamshell fashion. In some examples, the divider forms a portion of the first storage compartment and the divider forms a portion of the second storage compartment. In some examples, a hinge pivotally connecting the first and second rigid outer surfaces and the divider such that the first and second rigid outer surfaces and the divider are configured to pivot with respect to each other. The bike bag may have a storage volume of about 1.5 liters.

In a second embodiment, a bike bag includes a first storage compartment including a first rigid outer surface, the first storage compartment configured to be selectively closable. The bike bag further includes a second storage compartment including a second rigid outer surface, the second storage compartment separated from the first storage compartment by a divider. The second storage compartment is also configured to be selectively closable independently of the first storage compartment. The bike bag further includes a removable pouch configured to fit within the first storage compartment. The removable pouch incudes a third storage compartment configured to be selectively closable.

Implementations of the disclosure may include one or more of the following optional features. In some implementations, the removable pouch includes one or more rigid outer surfaces. The removable pouch may be configured to house a mobile electronic device. The removable pouch may further include a carrier strap configured to support the removable pouch when the removable pouch is removed from the bike bag. The carrier strap may be configured to be detachable.

In a third embodiment, a removable accessory pouch for a bike bag includes a storage including comprising a rigid outer surface, the storage compartment configured to be selectively closable. The removable accessory pouch further includes one or more strap attachment points pivotally attached to the rigid outer surface. The removable accessory pouch further includes a detachable carrier strap configured to attach to the one or more strap attachment points. The removable accessory pouch is configured to house a mobile electronic device, and the removable accessory pouch is configured to fit within a bike bag.

Implementations of the disclosure may include one or more of the following optional features. In some implementations, the removable accessory pouch further includes one or more elastic straps configured to secure the mobile electronic device within the removable accessory pouch.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "above" and "below", "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Figure 1:
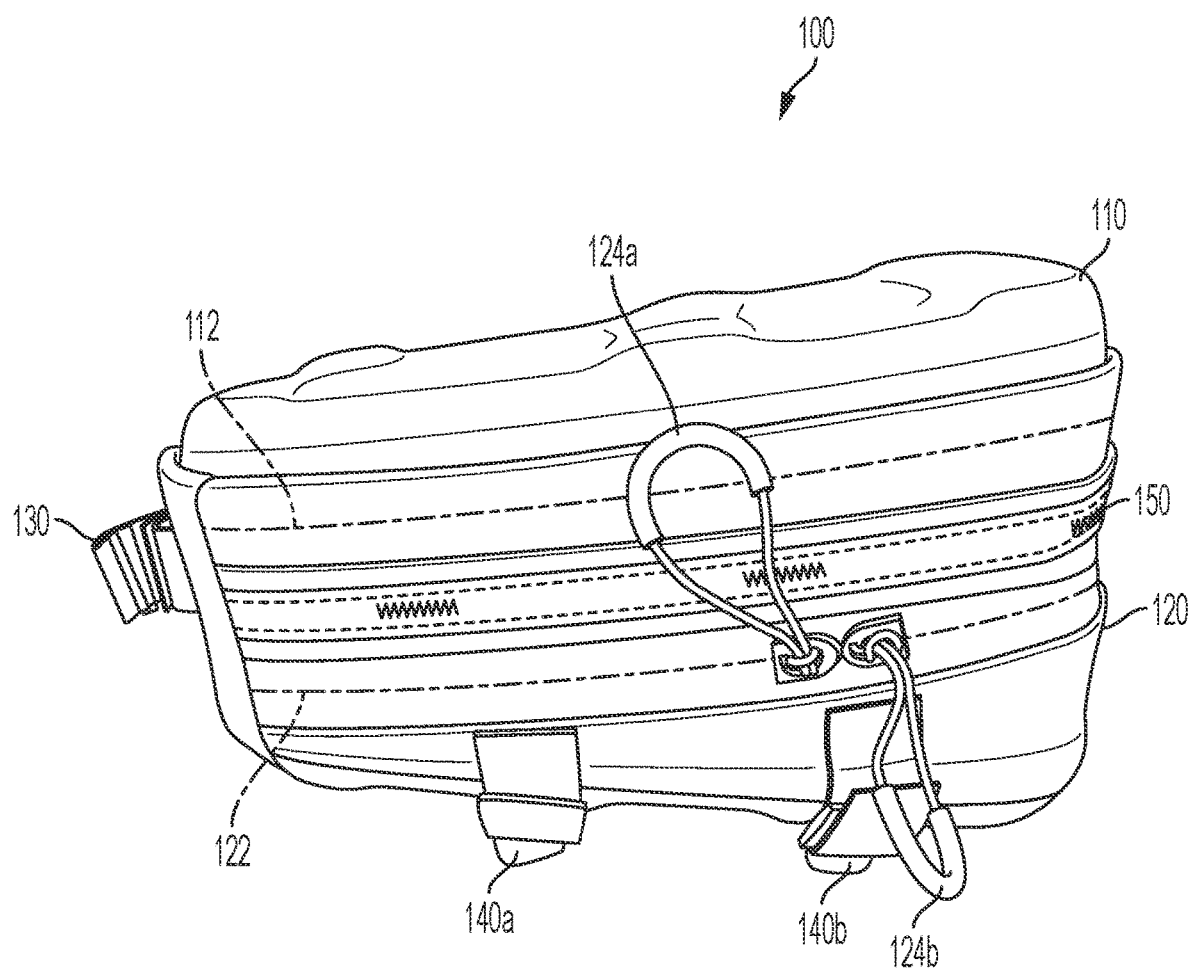
FIG. 1 presents a side view of an example bike bag.
Figure 3:
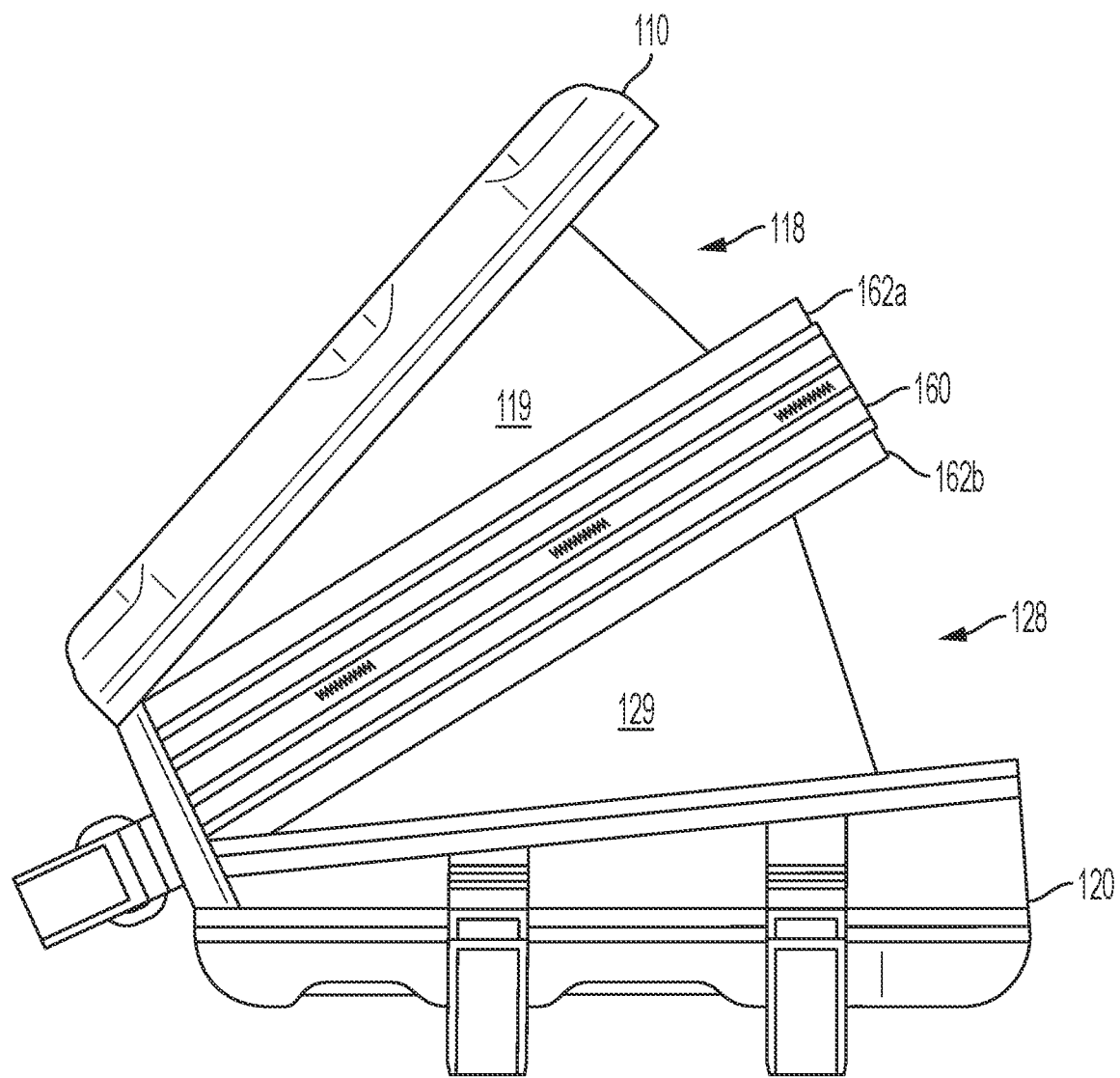
FIG. 3 shows the example bike bag in an open configuration.

FIG. 1 presents a side view of an example bike bag 100. The example bike bag 100 includes an upper storage compartment 110 and a lower storage compartment 120. In some examples, the total volume of the upper storage compartment 110 and lower storage compartment 120 is about 1.5 liters, although other configurations are possible. The upper and lower storage compartments (110, 120) include upper and lower mouths 118 and 128, respectively (FIG. 3). The upper and lower mouths 118 and 128, are selectively closeable via upper and lower zippers, 112 and 122, respectively (FIG. 1). As illustrated in FIG. 1, the upper and lower zippers (112, 122) are configured to be water resistant. That is, the upper and lower zippers (112, 122) are covered by "storm flaps" of material configured to shed water. The zippers themselves may include coil teeth, molded teeth, or metal teeth and may be coated or otherwise further treated to be water resistant. Other means for selectively opening and closing the upper and lower mouths (118, 128), such as latch fasteners are also in the scope of this disclosure. The upper and lower zippers (112, 122) may be operated by one or more zipper pulls 124. As illustrated in FIG. 1, lower zipper 122 may be operated by zipper pulls 124a and 124b. That is, pulling zipper pulls 124a and 124b apart from each other opens lower zipper 122, providing access to the lower storage compartment 120. The upper zipper 112 may be similarly operated by additional zipper pulls 124, (not shown) to provide access to the upper storage compartment 110. As illustrated in FIG. 1, the zipper pulls 124 include large loops of fabric or cord to provide comfort, improved ergonomics, and/or ease of handling. A portion of the pull may be enclosed in heat-shrink tubing to provide enhanced grip. In some embodiments, the zipper pulls 124 include a metal tab, or a combination of a metal tab combined with a loop of cord and fabric. In some embodiments, one or more zippers has a single zipper pull 124.

Figure 2A:
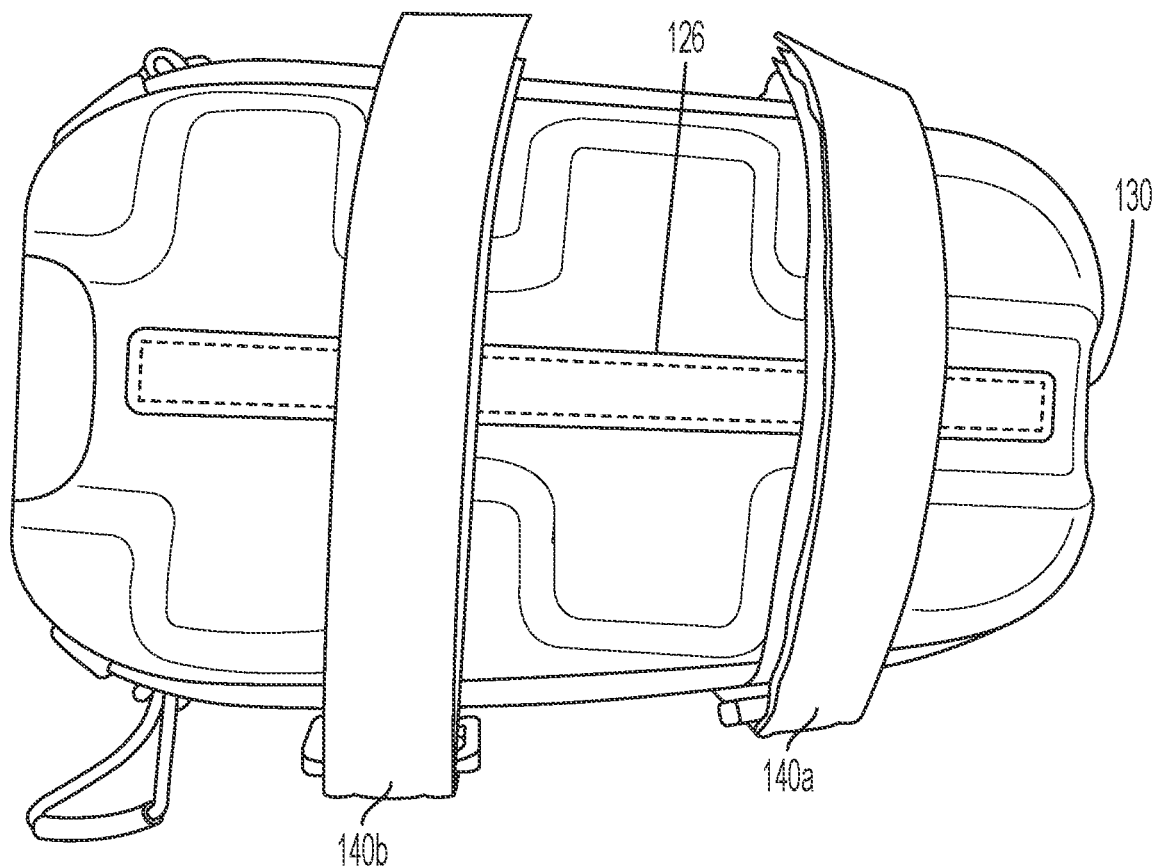
FIG. 2A presents a bottom view of the example bike bag.

The example bike bag 100 is configured to attach to the bike at a front attachment point 130. The front attachment point 130 may include a vertical recess shaped to accommodate a mating structure of the bicycle to which the example bike bag 100 is attached. As illustrated in FIG. 1, the front attachment point 130 includes an adjustable-length fabric loop which can be used to tightly encircle a portion of the bike, such as the seat tube, head tube, or other similar structure, and the fabric loop may be secured to itself by a hook-and-loop closure system. To adjust the length of the fabric loop (e.g., to accommodate attaching the bike bag to structures having a variety of diameters and shapes, and which may include control cables on the exterior of the structure that must also be accommodated), the attachment point may include a ring (e.g., a rectangular ring) through which the fabric loop may pass after encircling the structure but before securing the hook-and-loop fastening system. In some embodiments, the front attachment point 130 includes a snap-in clip, or an adjustable clamp configured to accommodate and securely attach to a variety of structures. The example bike bag 100 also includes one or more additional attachment points 140a, 140b on an adjacent side of the bike bag. The additional attachment points 140 securely attach the adjacent side (e.g., bottom) of the example bike bag 100 to the bike. The additional attachment points 140a, 140b may include elements that are similar to the elements described above with respect to the front attachment point 130. As shown in FIG. 2A, the bottom of the example bike bag 100 may include a longitudinal recess shaped to accommodate a mating structure of the bicycle to which the example bike bag 100 is attached. Within the recess, the example bike bag 100 may also include a longitudinal friction-enhancing element 126, such as a strip of a rubber material (e.g., glued within the recess), to reduce the chance of the example bike bag 100 slipping.

Figure 2B:
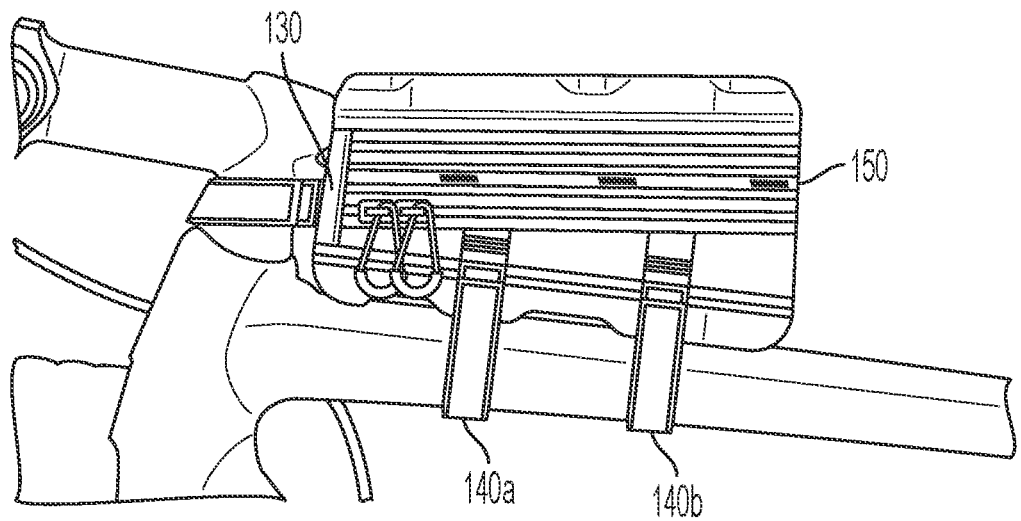
FIGS. 2B and 2C show the example bike bag attached to a bicycle.

As shown in FIG. 2B, the example bike bag 100 may be attached at the front attachment point 130 to a head tube of a bike, and at the additional attachment points 140a, 140b to a top tube of a bike. In this configuration, the upper and lower storage compartments (110, 120) may be conveniently accessible to the rider, e.g., during a bike ride. As shown in FIG. 3, the example bike bag 100 opens in a clamshell fashion, exposing the upper and/or lower storage compartments (110, 120) when the rider operates the upper and/or lower zippers (112, 122). Thus, the rider may selectively open either the upper and/or lower storage compartments (110, 120) and reach through the respective upper and lower mouths (118, 128) to access items in the respective upper and/or lower storage compartments (110, 120). The zipper pulls 124 are ergonomically configured for ease of grasping and ease of operating the respective zipper(s) (112, 122), e.g., while seated on the bike. Furthermore, the example bike bag 100 is configured to be firmly attached to the bike at the front attachment point 130 and the additional attachment point(s) 140, so that the zippers (112, 122), may be operated, to open and/or close the mouths (118, 128) with one hand, by pulling the zipper pull(s) 124 against the resistance provided by the firmly attached example bike bag 100 and without dislodging the example bike bag 100). As shown in FIG. 2A, the adjustable-length fabric loops at additional attachment points 140a, 140b are wider than the top tube of a bike. However, the longitudinal recess formed in the bottom of the example bike bag 100 is configured to resist transverse shifting of the example bike bag 100 when the adjustable-length fabric loops are tightened. The attachment of the example bike bag 100 at the head tube resists longitudinal shifting along the top tube and resists rotational shifting around the top tube. As described in more detail below with respect to FIG. 3, the example bike bag 100 includes additional features to prevent items from falling out of the example bike bag 100, e.g., when the rider accesses items during a bike ride.

Figure 2C:
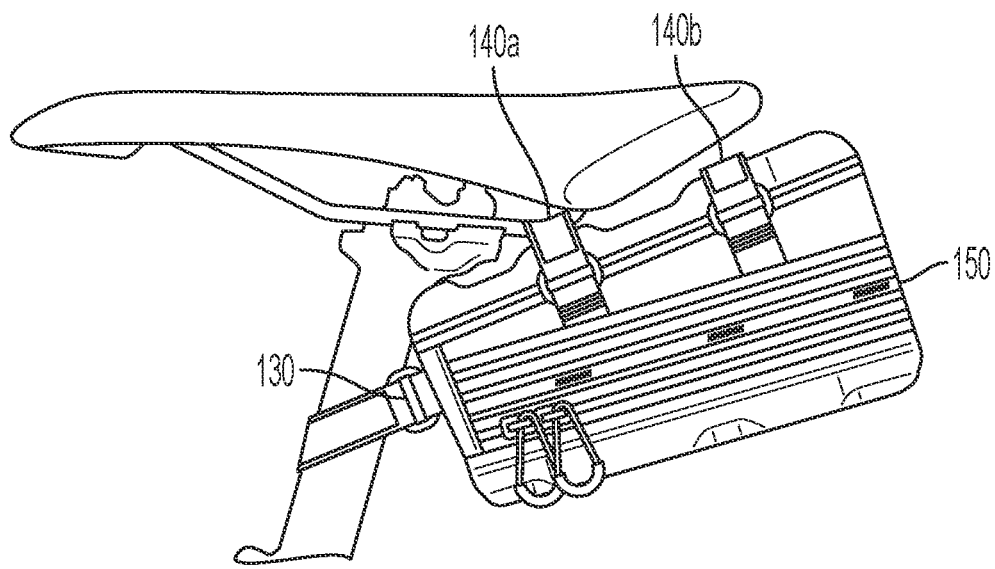

Alternatively, as shown in FIG. 2C, with the example bike bag 100 inverted, the example bike bag 100 may be attached at the front attachment point 130 to a seat tube of a bike, and at (at least one of the) the additional attachment points 140a, 140b (located on the top of the inverted example bike bag 100) to saddle rails beneath a saddle of a bike. The relatively wide adjustable-length fabric loops at additional attachment points 140a, 140b are configured to accommodate the two rails of a typical bike saddle (one rail on either side of the saddle). In this configuration, the example bike bag 100 may be less accessible than in the configuration of FIG. 2B. However, by disposing the example bike bag 100 below the saddle, the example bike bag (and its associated contents) may be less affected by a crash. For example, the saddle and/or the rider (when it the typical riding position) may protect the example bike bag 100 against impact from the side (at least to some degree). In this configuration, the example bike bag 100 is also configured to open in a clamshell fashion. However, the example bike bag 100 opened by pivoting downward, rather than pivoting upward as when the example bike bag 100 is disposed at the head tube. Thus, the example bike bag 100 is fully operational when disposed in either of these locations, albeit less accessible to a rider seated on the bike when disposed under the saddle. That is, the example bike bag 100 does not need to be removed from the bike in order to access its contents when the example bike bag 100 is disposed in either location. Therefore, the rider has the option of attaching the example bike bag 100 in a convenient location, allowing easy access to its contents, or a more well protected location. Furthermore, the rider may conveniently switch the example bike bag 100 between these locations, e.g., depending on the relative priorities of accessibility and protection.

As shown in FIG. 1, the example bike bag 100 may also include a reflective portion 150 to improve visibility of the bike. The reflective portion 150 may be configured to be visible when the example bike bag is disposed in any of the mounting locations discussed above. The reflective portion 150 may be a strip of reflective material disposed on the side and/or back of the example bike bag 100. In some examples, the reflective portion 150 includes a linear series of separate reflective elements. Other arrangements of reflective elements are also within the scope of this disclosure.

FIG. 3 shows the example bike bag 100 in an open configuration, allowing access to both the upper storage compartment 110 and the lower storage compartment 120. As shown in FIG. 3, the upper storage compartment 110 and the lower storage compartment 120 are separated by a divider portion 160. The divider portion 160 may be configured to keep items in the upper storage compartment 110 and the lower storage compartment 120 separate from each other. In other words, each compartment 110, 120 may be formed, in part, by the divider portion 160, such that in order to access items in the upper storage compartment 110, the upper mouth 118 must be in an open configuration. Similarly, to access items in the lower storage compartment 120, the lower mouth 128 must be in an open configuration. The divider portion 160 may include a pouch or elastic straps (not shown) attached to the exposed top and/or bottom surfaces of the divider portion 160 (i.e., at or near the bottom of the upper storage compartment 110 and/or at or near the top of the lower storage compartment 120). The pouch or straps may be used to retain small items at particular points within the upper and/or lower storage compartments (110, 120). The divider portion 160 may also include one or more lips (e.g., 162a, 162b) disposed between the zippers (112, 122) and the storage compartments (110, 120) to help prevent items from falling out of the storage compartments (110, 120) when the mouths (118, 128) are opened. The lips may be formed from a rigid, semi-rigid material, or elastic material such as layered polyester or rubber. Each of the upper and/or lower storage compartments (110, 120) may also include a side portions (e.g., walls 119, 129) to help prevent items from falling out of the storage compartments (110, 120) when the mouths (118, 128) are opened. As shown in FIG. 3, the upper and lower storage compartments (110, 120) include flexible elastic walls (119, 129) which are exposed when the respective mouths (118, 128) are opened. In some examples, the walls (119, 129) include a spandex material. The walls (119, 129) may provide the additional benefit of preventing the respective mouths (118, 128) from opening too wide.

The upper and lower storage compartments (110, 120) may each include a rigid, hard-sided shell, such that when the respective upper and lower mouths (118, 128) are opened, the rigid shells may pivot away from each other (and/or away from the divider portion 160) in a clamshell fashion. The rigid shells may each be flexibly attached to the divider portion 160 near the front of the example bike bag 100, so that the shells and the divider portion 160 may pivot with respect to each other when the respective upper and lower mouths (118, 128) are in an open configuration. The flexible attachment may be a fabric or rubber hinge, or may be an articulating structure formed from, e.g., interconnecting rigid elements, such as a plastic or metal components. Other structures that pivotally attach the divider portion 160 and the upper and lower storage compartments (110, 120) are also within the scope of this disclosure. In some examples, a fabric hinge joins the rigid, hard-sided shell of the upper storage compartment 110, the rigid, hard-sided shell of the lower storage compartment 120, and the divider portion 160 together, so that the each of the shells and the divider portion 160 may independently pivot with respect to each other about the fabric hinge when the respective upper and lower mouths 118 and 128 are selectively opened. And when the upper or lower mouth 118 and 128 is selectively closed, the respective upper or lower shell may be prevented from pivoting with respect to the divider portion 160. In other words, the divider portion 160 and the respective upper or lower shell may form the selectively closeable upper and lower storage compartments (110, 120).

In some examples, the shells are formed using compression molding of one or more thermoplastic or thermosetting polymers. In some examples, the shells include a composite material. The composite material may include foam sheets and polyester fabrics. The shells may form the rigid outer surfaces of the bike bag. In some examples, the shells are shaped to provide extra rigidity and/or to conform to one or more mounting locations on a bicycle. For example, the shells may include the vertical recess and/or longitudinal recess described above and shaped to accommodate a mating structure of the bicycle to which the example bike bag 100 is attached. The upper and lower storage compartments (110, 120) may each include a layer of padding or other material between the rigid shells and the portion of the upper and lower storage compartments (110, 120) where items may be stored.

Figure 4A:
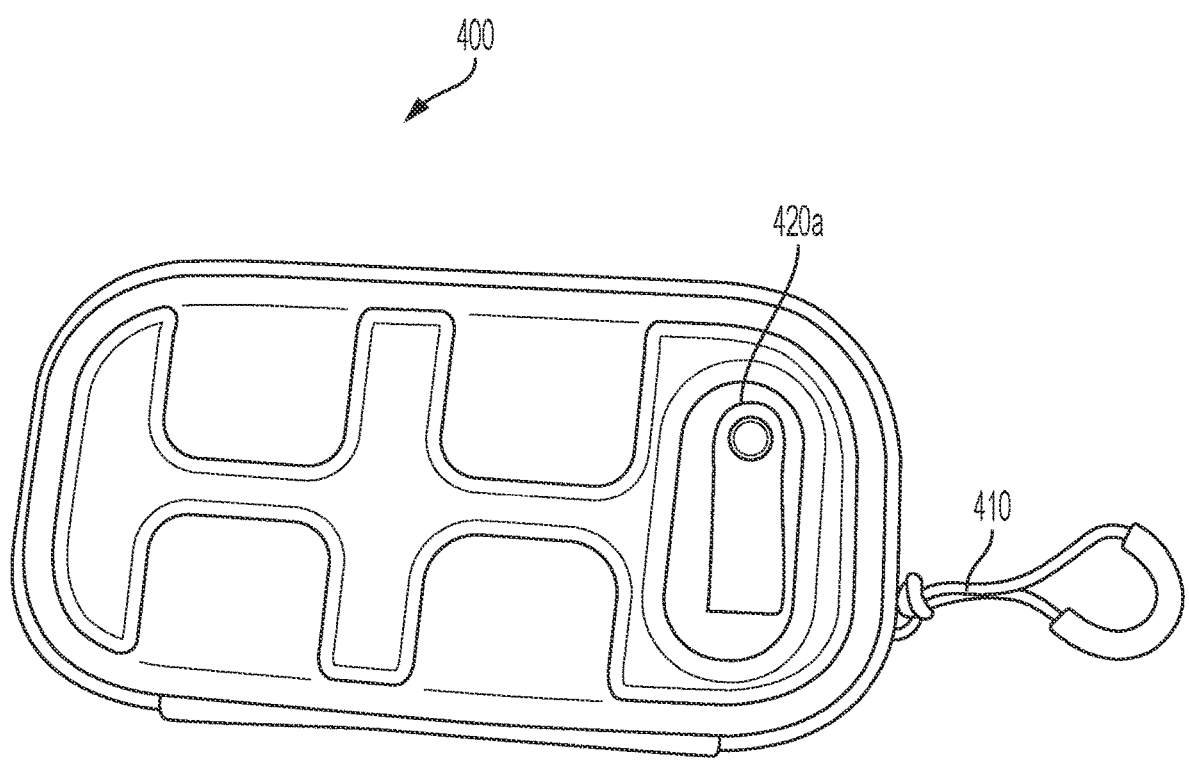
FIGS. 4A-4E show an example accessory pouch.

In some examples, the example bike bag 100 includes a removable accessory pouch. FIG. 4A shows an example accessory pouch 400 configured to fit inside the example bike bag 100. As shown, the example accessory pouch 400 includes top and bottom hard shells (FIG. 4B, 430a, 430b) joined by a zipper. In other configurations, e.g., when the bike bag includes hard sides, the example accessory pouch 400 may be a soft pouch. As shown, the top and bottom hard shells (430a, 430b) form rigid outer surfaces of the example accessory pouch 400. The example accessory pouch 400 includes a storage compartment between the top and bottom hard shells 430 which is selectively accessible by operating a zipper using zipper pull 410. As described above with respect to the example bike bag 100, the zipper of the example accessory pouch 400 may also be weather resistant, e.g., to protect the contents of the example accessory pouch 400 when the example accessory pouch 400 is removed from the example bike bag 100. The storage compartment may be configured to house a mobile device (e.g., phone, music player, GPS, etc.) or other delicate items, e.g., to provide additional protection whether the example accessory pouch 400 is within the example bike bag 100 or the example accessory pouch 400 is removed from the example bike bag 100. In some examples, the hard shells 430 of the example accessory pouch 400 may include materials similar to the hard shells of the example bike bag 100, and may be formed using similar manufacturing processes. The hard shells 430 of the example accessory pouch 400 may be padded on the inside of the example accessory pouch 400, e.g., by a polyester fabric, to provide extra protection to the contents (similar to the hard shells of the example bike bag 100). In some examples, the example accessory pouch 400 includes elastic straps (450a, 450b, FIG. 4C) or other securing mechanism configured to limit the ability of a mobile phone (or other delicate item) to shift within the example accessory pouch 400. In some examples, the example accessory pouch 400 includes a soft interior pocket (434, FIG. 4C) intended to hold contents securely and separately from, e.g., phone.

Figure 4B:
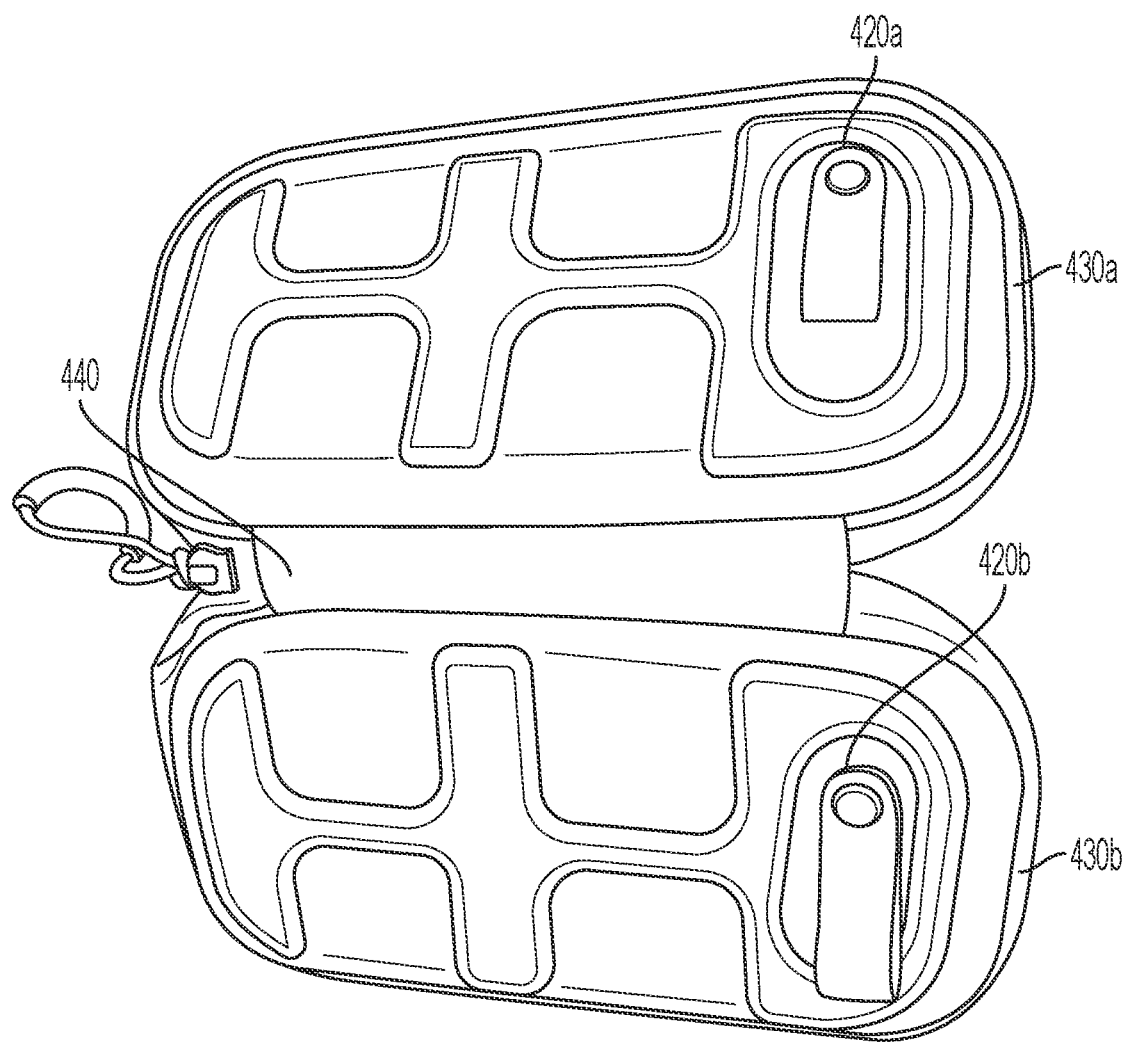
Figure 4C:
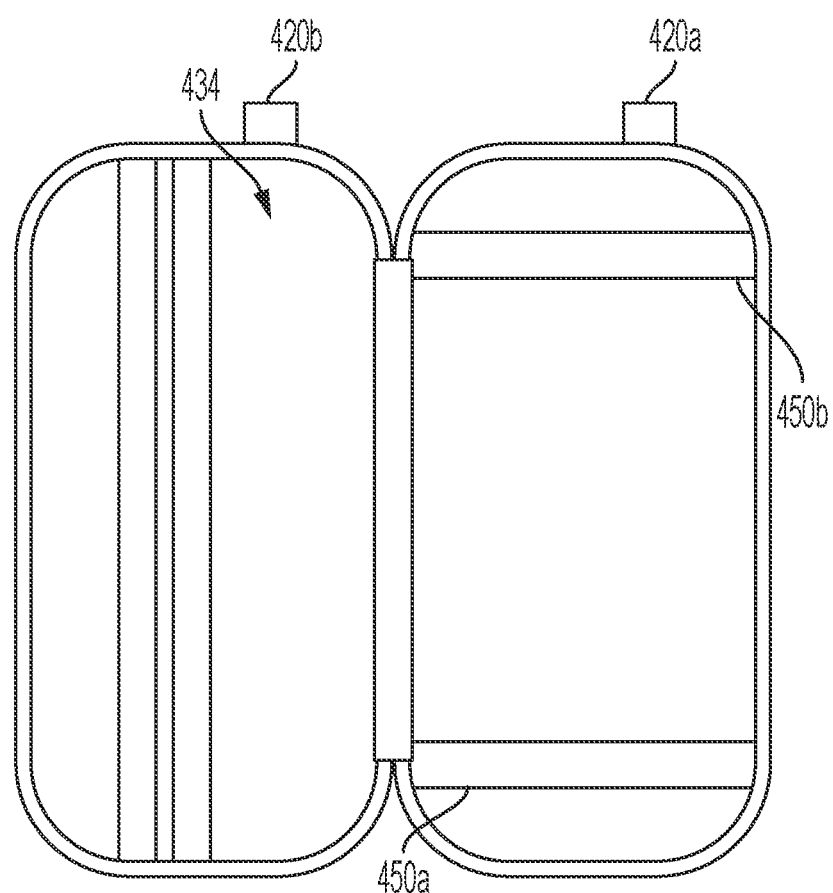

FIGS. 4B and 4C show the storage compartment of the example accessory pouch 400 in an opened confirmation. As shown, the example accessory pouch 400 includes a single zipper pull 410. With the zipper of the example accessory pouch 400 opened (as shown in FIG. 4B) a fabric hinge 440 allows the hard shells 430 to pivot with respect to each other (about the fabric hinge 440) to provide access to the storage compartment. In some examples, the example accessory pouch 400 includes one or more strap attachment points 420. As shown, the example accessory pouch 400 includes two strap attachment points 420a, 420b, one strap attachment point pivotally connected (e.g., riveted to) each of the hard shells (430a, 430b). FIG. 4B shows the strap attachment points 420a, 420b pivoted to a non-deployed position.

Figure 4D:
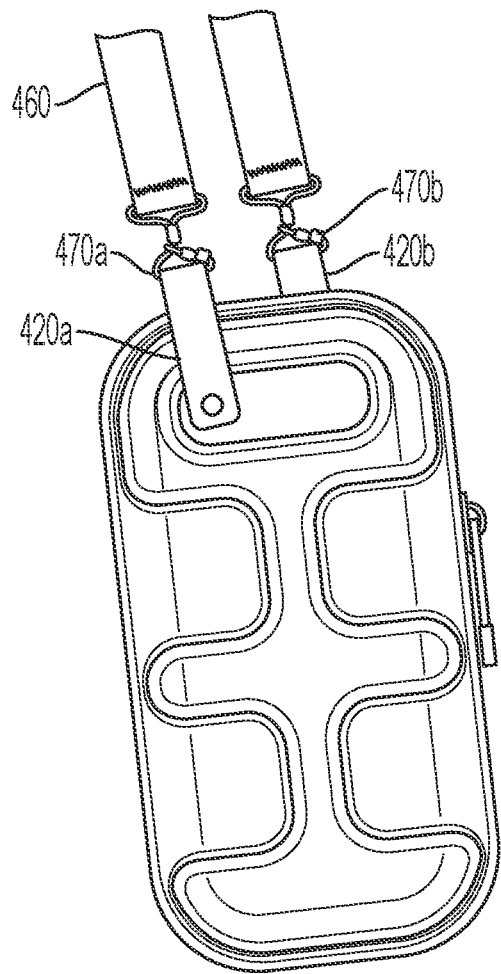
Figure 4E:
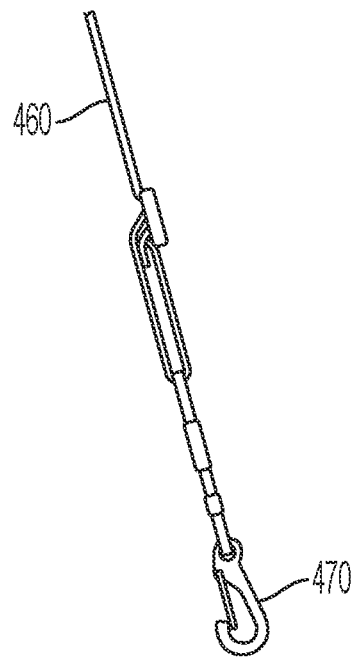

FIGS. 4D and 4E show the strap attachment points 420a, 420b pivoted to a deployed position. The strap attachment points 420a, 420b may include a loop of material, such as a synthetic rubber, to which a carrier strap 460 may be attached allowing the rider to wear the example accessory pouch 400, e.g., over the shoulder or around the neck. For example, the rider may wear the example accessory pouch 400 so that the rider can carry valuables (e.g., wallet, mobile phone, keys, etc.) during a break from a bike ride, rather than leaving the valuables in the example bike bag 100 during the break. Alternatively, the rider may use the example accessory pouch 400 during periods of time when the example bike bag 100 is attached below the saddle of the bike, or is otherwise inaccessible, so that the ride can access particular items (e.g. mobile phone) during a bike ride. The strap 460 may include a hook 470 or other attachment mechanism on each end. For example, as shown in FIGS. 4D and 4E, the strap 460 may include a hook (470a, 470b) at each end that is configured to pass through the strap attachment points 420a, 420b and hook to the strap, securing each end of the strap to the strap attachment points 420a, 420b. Alternatively, the hook (470a, 470b) at each end of the strap 460 may simply hook to the respective strap attachment points 420a, 420b. Other configurations that allow the strap 460 to attach to the example accessory pouch 400 are also within the scope of this disclosure.

The above-disclosed features and functions, as well as alternatives, may be combined into many other different apparatuses or applications. Various presently unforeseen or unanticipated alternatives, modifications, variations or improvements may be made by those skilled in the art, each of which is also intended to be encompassed by the disclosed embodiments.

The invention claimed is:

1. A bike bag comprising:
a divider portion comprising a divider portion wall;
a first storage compartment comprising:
a first rigid outer surface, and
a first storage compartment wall configured to be selectively closable to the divider portion;
a second storage compartment comprising:
a second rigid outer surface, and
a second storage compartment wall configured to be selectively closable to the divider portion independently of the first storage compartment wall; and
an attachment system comprising:
a first attachment member disposed at a first side of the bike bag and coupled to the divider portion wall between the first storage compartment and the second storage compartment, and
a second attachment member disposed at a second side of the bike bag and coupled to the second rigid outer surface, the second side adjacent to the first side of the bike bag;
wherein the first side is coupled to the divider portion, the first storage compartment, and the second storage compartment; and
wherein the bike bag is configured to be selectively couplable, using the first attachment member and the second attachment member, to at least a top tube or a saddle of a bike.

2. The bike bag of claim 1, further comprising a first water-resistant zipper, wherein the first storage compartment is configured to be selectively closable by the first water-resistant zipper.

3. The bike bag of claim 1, wherein the first attachment member comprises an adjustable-length hook-and-loop closure system.

4. The bike bag of claim 1, wherein the first storage compartment further comprises flexible walls that are exposed when the first storage compartment is opened.

5. The bike bag of claim 1, further comprising one or more reflective elements.

6. The bike bag of claim 1, wherein at least one of the first or second rigid outer surfaces is shaped to conform to a part of the bike.

7. The bike bag of claim 1, wherein the first and second rigid outer surfaces are configured to pivot with respect to each other in a clamshell fashion.

8. The bike bag of claim 1, wherein:
the divider portion forms a portion of the first storage compartment; and
the divider portion forms a portion of the second storage compartment.

9. The bike bag of claim 1, further comprising:
a hinge pivotally connecting the first and second rigid outer surfaces and the divider portion such that the first and second rigid outer surfaces and the divider portion are configured to pivot with respect to each other.

10. The bike bag of claim 1, wherein the bike bag has a storage volume of about 1.5 liters.

11. A bike bag comprising:
a divider portion comprising:
a divider portion wall,
a first lip extending above the divider portion wall, and
a second lip extending below the divider portion wall;

a first storage compartment comprising:
  a first rigid outer surface, and
  a first storage compartment wall;
a second storage compartment comprising:
  a second rigid outer surface, and
  a second storage compartment wall;
a first flexible elastic wall coupled to the divider portion and the first storage compartment, the first flexible elastic wall configured to limit movement of the first storage compartment relative to the divider portion;
a second flexible elastic wall coupled to the divider portion and the second storage compartment, the second flexible elastic wall configured to limit movement of the second storage compartment relative to the divider portion;
a first zipper selectively coupling the divider portion wall to the first storage compartment wall such that the first lip extends between the divider portion wall and the first storage compartment wall; and
a second zipper selectively coupling the divider portion wall to the second storage compartment wall such that the second lip extends between the divider portion wall and the second storage compartment wall.

12. The bike bag of claim 11, further comprising a removable pouch configured to fit within the first storage compartment, the removable pouch comprising a third storage compartment configured to be selectively closable, wherein the removable pouch comprises one or more rigid outer surfaces.

13. The bike bag of claim 11, further comprising a removable pouch configured to fit within the first storage compartment, the removable pouch comprising a third storage compartment configured to be selectively closable, wherein the removable pouch is configured to house a mobile electronic device.

14. The bike bag of claim 11, further comprising a removable pouch configured to fit within the first storage compartment, the removable pouch comprising a third storage compartment configured to be selectively closable, wherein the removable pouch further comprises a carrier strap configured to support the removable pouch when the removable pouch is removed from the bike bag.

15. The bike bag of claim 14, wherein the carrier strap is configured to be detachable.

16. The bike bag of claim 11, further comprising a removable pouch configured to fit within the first storage compartment, the removable pouch comprising a third storage compartment configured to be selectively closable;
  wherein the third storage compartment comprises a third rigid outer surface and is configured to be selectively closeable;
  wherein the removable pouch further comprises:
    one or more strap attachment points pivotally attached to the third rigid outer surface, and
    a detachable carrier strap configured to attach to the one or more strap attachment points; and
  wherein the removable pouch is configured to house a mobile electronic device.

17. The bike bag of claim 16, further comprising one or more elastic straps configured to secure the mobile electronic device within the removable pouch.

18. The bike bag of claim 11, wherein:
the first zipper extends alongside the first flexible elastic wall; and
the second zipper extends alongside the second flexible elastic wall.

19. The bike bag of claim 1, wherein:
the divider portion wall is centrally located between the first storage compartment wall and the second storage compartment wall when the first storage compartment wall is closable to the divider portion and the second storage compartment wall is closable to the divider portion; or
the divider portion wall is flat.

20. A bike bag comprising:
a divider portion comprising:
  a divider portion wall,
  a first lip extending above the divider portion wall, and
  a second lip extending below the divider portion wall;
a first storage compartment comprising:
  a first rigid outer surface, and
  a first storage compartment wall;
a second storage compartment comprising:
  a second rigid outer surface, and
  a second storage compartment wall;
a first zipper selectively coupling the divider portion wall to the first storage compartment wall such that the first lip extends between the divider portion wall and the first storage compartment wall;
a second zipper selectively coupling the divider portion wall to the second storage compartment wall such that the second lip extends between the divider portion wall and the second storage compartment wall; and
an attachment system comprising:
  a first attachment member disposed at a first side of the bike bag and coupled to the divider portion between the first storage compartment and the second storage compartment, and
  a second attachment member disposed at a second side of the bike bag and coupled to the second storage compartment, the second side adjacent to the first side of the bike bag;
wherein the first side is coupled to the divider portion, the first storage compartment, and the second storage compartment; and
wherein the bike bag is configured to be selectively couplable, using the first attachment member and the second attachment member, to at least a top tube or a saddle of a bike.

* * * * *